United States Patent
Geuss et al.

(10) Patent No.: US 7,904,800 B2
(45) Date of Patent: *Mar. 8, 2011

(54) TRANSFORMING A PORTION OF A DATABASE INTO A CUSTOM SPREADSHEET

(75) Inventors: Jo-Ann M. Geuss, Woodstock, NY (US); William M. Houston, Williston, VT (US); James A. Martin, Jr., Endicott, NY (US); Raymond A. Rupert, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 1441 days.

This patent is subject to a terminal disclaimer.

(21) Appl. No.: 11/232,315

(22) Filed: Sep. 21, 2005

(65) Prior Publication Data

US 2006/0015525 A1    Jan. 19, 2006

Related U.S. Application Data

(62) Division of application No. 10/040,818, filed on Jan. 7, 2002, now Pat. No. 6,988,242.

(51) Int. Cl.
*G06F 17/30* (2006.01)
(52) U.S. Cl. .......... 715/212; 715/217; 707/705; 707/756
(58) Field of Classification Search .......... 715/212–220, 715/227–228, 243; 707/1, 7, 10, 100–102, 707/104.1
See application file for complete search history.

(56) References Cited

U.S. PATENT DOCUMENTS

| | | | | |
|---|---|---|---|---|
| 5,293,615 A * | 3/1994 | Amada | | 707/4 |
| 5,359,724 A * | 10/1994 | Earle | | 707/205 |
| 5,734,889 A | 3/1998 | Yamaguchi | | |
| 5,953,730 A | 9/1999 | Schawer | | |
| 5,966,716 A | 10/1999 | Comer et al. | | |
| 6,035,321 A * | 3/2000 | Mays | | 718/103 |
| 6,052,693 A * | 4/2000 | Smith et al. | | 707/104.1 |
| 6,154,756 A * | 11/2000 | Hearn et al. | | 715/236 |
| 6,292,881 B1* | 9/2001 | Tanaka et al. | | 712/41 |
| 6,317,750 B1* | 11/2001 | Tortolani et al. | | 707/103 R |
| 6,405,208 B1* | 6/2002 | Raghavan et al. | | 707/102 |
| 6,604,095 B1 | 8/2003 | Cesare et al. | | |
| 6,697,693 B2* | 2/2004 | Hagiwara et al. | | 700/117 |
| 6,757,867 B2 | 6/2004 | Bauchot et al. | | |
| 6,915,289 B1* | 7/2005 | Malloy et al. | | 707/2 |
| 6,988,105 B2* | 1/2006 | Houston et al. | | 707/100 |
| 7,082,569 B2* | 7/2006 | Voshell | | 715/212 |
| 7,359,916 B2* | 4/2008 | Werner | | 1/1 |
| 7,370,271 B2* | 5/2008 | Killen et al. | | 715/212 |
| 2001/0054034 A1* | 12/2001 | Arning et al. | | 707/1 |
| 2002/0116417 A1* | 8/2002 | Weinberg et al. | | 707/517 |
| 2008/0046803 A1* | 2/2008 | Beauchamp et al. | | 715/212 |

* cited by examiner

*Primary Examiner* — Adam L Basehoar
(74) *Attorney, Agent, or Firm* — Schmeiser, Olsen & Watts; William E. Schiesser

(57) ABSTRACT

A method and computer system for transforming a portion (e.g., a view) of a database into a custom spreadsheet. The transforming includes determining whether to omit in the custom spreadsheet a column that is in the view, determining whether to add to the custom spreadsheet a column that is not in the view, or both. The transforming may also include implementation of rules that control how various portions of the custom spreadsheet are configured.

19 Claims, 7 Drawing Sheets

| Year | Month | Service Description | Account Group ID | Plan | Actual | Delta | % Delta | YTD Plan | YTD Actual | YTD Delta |
|---|---|---|---|---|---|---|---|---|---|---|
| ▽2001 | | | | | | | | | | |
| | ▷Jan | | | 29,120 | 31,472 | 2,352 | 8.08 | 60,444 | 65,341 | 4,897 |
| | ▷Feb | | | 22,510 | 20,491 | -2,019 | -8.97 | 52,582 | 52,123 | -459 |
| | ▷Mar | | | 33,205 | 34,319 | 1,114 | 3.35 | 65,781 | 64,620 | -1,161 |
| | ▽Apr | | | | | | | | | |
| | | ▽LB LONG | | | | | | | | |
| | | | ▷34AC1 | 3,351 | 4,713 | 1,362 | 40.64 | 9,231 | 8,419 | -812 |
| | | | ▷34AC2 | 2,643 | 1,980 | -663 | -25.09 | 5,372 | 5,381 | 9 |
| | | | ▷34AE1 | 553 | 987 | 434 | 78.48 | 1,671 | 1,621 | -50 |
| | | | ▷34AE2 | 1,005 | 1,452 | 447 | 44.48 | 2,548 | 3,129 | 581 |
| | | ▽CS SRVC | | | | | | | | |
| | | | ▷34AC1 | 4,218 | 4,444 | 226 | 5.36 | 9,852 | 9,963 | 111 |
| | | | ▷34AC2 | 765 | 786 | 21 | 2.75 | 1,820 | 1,864 | 44 |
| | | | ▷34AE2 | 0 | 54 | 54 | 0.00 | 763 | 699 | -64 |
| | | ▽TE-EXTN | | | | | | | | |
| | | | ▷34AE1 | 1,076 | 1,345 | 269 | 25.00 | 2,352 | 1,986 | -366 |
| | | | ▷34AE2 | 2,490 | 4,891 | 2,401 | 96.43 | 6,746 | 6,975 | 229 |
| | | ▽TE-TOLL | ▷34AE1 | 899 | 951 | 52 | 5.78 | 2,500 | 2,753 | 253 |
| | | | ▷34AE2 | 1,405 | 2,814 | 1,409 | 100.28 | 5,432 | 5,152 | -280 |

*FIG. 1*

BILLING DETAIL
Originated By Solutions Support on 05/01/2001 09:49:10AM
Last Modified By Solutions Support on 05/01/2001 10:05:14AM
Plan Vs. Actual Details

| Reporting Year | 2001 |
|---|---|
| Report Type | Account Group |
| Reporting Month | April |
| Account Group ID | 34AE2 |
| Account Group Description | Logistics |
| Service Type | AEM |
| Service Description | LB LONG |
| Plan ($) | 1,005 |
| Actual ($) | 1,452 |
| Delta ($) | 447 |
| Percent of Plan ($) | 144.5 |
| YTD Plan ($) | 2,548 |
| YTD Actual ($) | 3,129 |
| YTD Delta ($) | 581 |
| YTD Percent of Plan | 122.8 |

FIG. 2

Report of Account Group 34AE2 For April 2001
($ Sheet)

| A | B | C | D | E | F | G |
|---|---|---|---|---|---|---|
| Internal Use Only | | | | DCS North Solution Team | | |
| Account Group | | | | | IBM Global Services | |
| April 2001 05/01/2001 | | | | | | |
| | | | | | | |
| | | | | Customer Level 1: IBM | | |
| | | | | Customer Level 2: IMD | | |
| | | | | Customer Level 3: TECH | | |
| | | | | Account Group: 34AE2 | | |
| | | | | BLM SERVER | | |
| Account Group ID | Service Type | Service Description | Curr Month Plan ($) | Curr Month Actual ($) | Curr Month Delta ($) | Pct of Plan % |
| 34AE2 | ADM | LB LONG | 1,005 | 1,452 | 447 | 144.5% |
| | | | 1,005 | 1,452 | 447 | 144.5% |
| | | | | | | |
| | CS | SRVC | 0 | 54 | 54 | 100+% |
| | | | 0 | 54 | 54 | 100+% |
| | | | | | | |
| | GVT | TE-EXTN | 2,490 | 4,891 | 2,401 | 196.4% |
| | | TE-TOLL | 1,405 | 2,814 | 1,409 | 200.3% |
| | | | 3,895 | 7,705 | 3,810 | 197.8% |

*FIG. 3*

Report of Account Group 34AE2 For April 2001
(H Sheet)

| A | B | C | D | E | F | G |
|---|---|---|---|---|---|---|
| Internal Use Only | | | | DCS North Solution Team | | |
| Account Group | | | | | IBM Global Services | |
| April 2001 05/01/2001 | | | | | | |
| | | | | | | |
| | | | | | Customer Level 1: IBM | |
| | | | | | Customer Level 2: IMD | |
| | | | | | Customer Level 3: TECH | |
| | | | | | Account Group: 34AE2 | |
| | | | | | BLM SERVER | |
| Account Group ID | Service Type | Service Description | Curr Month Plan (H) | Curr Month Actual (H) | Curr Month Delta (H) | Pct of Plan % |
| 34AE2 | ADM | LB LONG | 20,100 | 29,040 | 8,940 | 144.5% |
| | | | 20,100 | 29,040 | 8,940 | 144.5% |
| | | | | | | |
| | CS | SRVC | 0 | 1,350 | 1,350 | 100+% |
| | | | 0 | 1,350 | 1,350 | 100+% |
| | | | | | | |
| | GVT | TE-EXTN | 74,700 | 146,730 | 72,030 | 196.4% |
| | | TE-TOLL | 56,200 | 112,560 | 56,360 | 200.3% |
| | | | 130,900 | 259,290 | 128,390 | 198.1% |

*FIG. 4*

| Rule Set Type | Controls | Module Name |
|---|---|---|
| Column selection rules | • columns added<br>• columns omitted | ColumnSelection |
| Range formatting rules | • font<br>• color<br>• data type<br>• justification | RangeFormat |
| Column title rules | • columns title labeling<br>• columns title formatting | ColumnTitle |
| Report header rules | • report header content<br>• report header formatting | ReportHeader |
| Report footer rules | • report footer content<br>• report footer formatting | ReportFooter |
| Totaling rules | • totaling and subtotaling content<br>• totaling and subtotaling formatting | Totaling |
| Translation rules | • data translations | Translation |
| Calculation rules | • data calculation | Calculation |
| Report naming and placement rules | • report naming<br>• report location<br>  (server, web, directory path, etc.) | NamingAndPlacement |
| Sheet rules | • naming of sheets<br>• formatting of sheets | Sheet |
| Document collection rules | • method of obtaining a subset of<br>  database documents to export<br>• criteria for selecting a subset of<br>  database documents to export | DocumentCollection |

TRANSFORMING A PORTION OF A DATABASE INTO A CUSTOM SPREADSHEET

This application is a divisional of Ser. No. 10/040,818, filed Jan. 7, 2002 and presently issued as U.S. Pat. No. 6,988,242.

BACKGROUND OF THE INVENTION

1. Technical Field

The present invention relates to a method and computer system for transforming a portion of a database into a custom spreadsheet.

2. Related Art

Within LOTUS DOMINO®, there is a native capability to export a view of a database to a spreadsheet, such that every column and row of the view goes to a corresponding column and row of the spreadsheet. There is a need for a capability to export a view of a database to a spreadsheet in a manner that is more flexible than that provided by the aforementioned native capability within LOTUS DOMINO®.

SUMMARY OF THE INVENTION

The present invention provides a method for generating a custom spreadsheet, said method comprising transforming a view of a database into the custom spreadsheet, wherein the transforming includes determining selected from the group consisting of determining whether to omit in the custom spreadsheet a column that is in the view, determining whether to add to the custom spreadsheet a column that is not in the view, and combinations thereof.

The present invention provides a computer system for generating a custom spreadsheet, said computer system comprising software adapted to transform a view of a database into the custom spreadsheet, wherein to transform includes to determine selected from the group consisting of to determine whether to omit in the custom spreadsheet a column that is in the view, to determine whether to add to the custom spreadsheet a column that is not in the view, and combinations thereof.

The present invention provides a capability to export a portion (i.e., a view) of a database to a spreadsheet in a manner that is more flexible than that provided by a native capability within LOTUS DOMINO®.

BRIEF DESCRIPTION OF THE DRAWINGS

FIG. 1 depicts a view into a database structure, said view disclosing a list of documents, in accordance with embodiments of the present invention.

FIG. 2 depicts a document listed in the view of FIG. 1, in accordance with embodiments of the present invention.

FIG. 3 depicts a first custom spreadsheet generated from the view of FIG. 1, in accordance with embodiments of the present invention.

FIG. 4 depicts a second custom spreadsheet that differs from the first custom spreadsheet of FIG. 3 in that the first custom spreadsheet expresses amounts in units of dollars while the second custom spreadsheet expresses amounts in units of hours of work, in accordance with embodiments of the present invention.

FIG. 6 is a tabulation of rule sets that contain rules for generating a custom spreadsheet, in accordance with embodiments of the present invention.

DETAILED DESCRIPTION OF THE INVENTION

Figure 5:
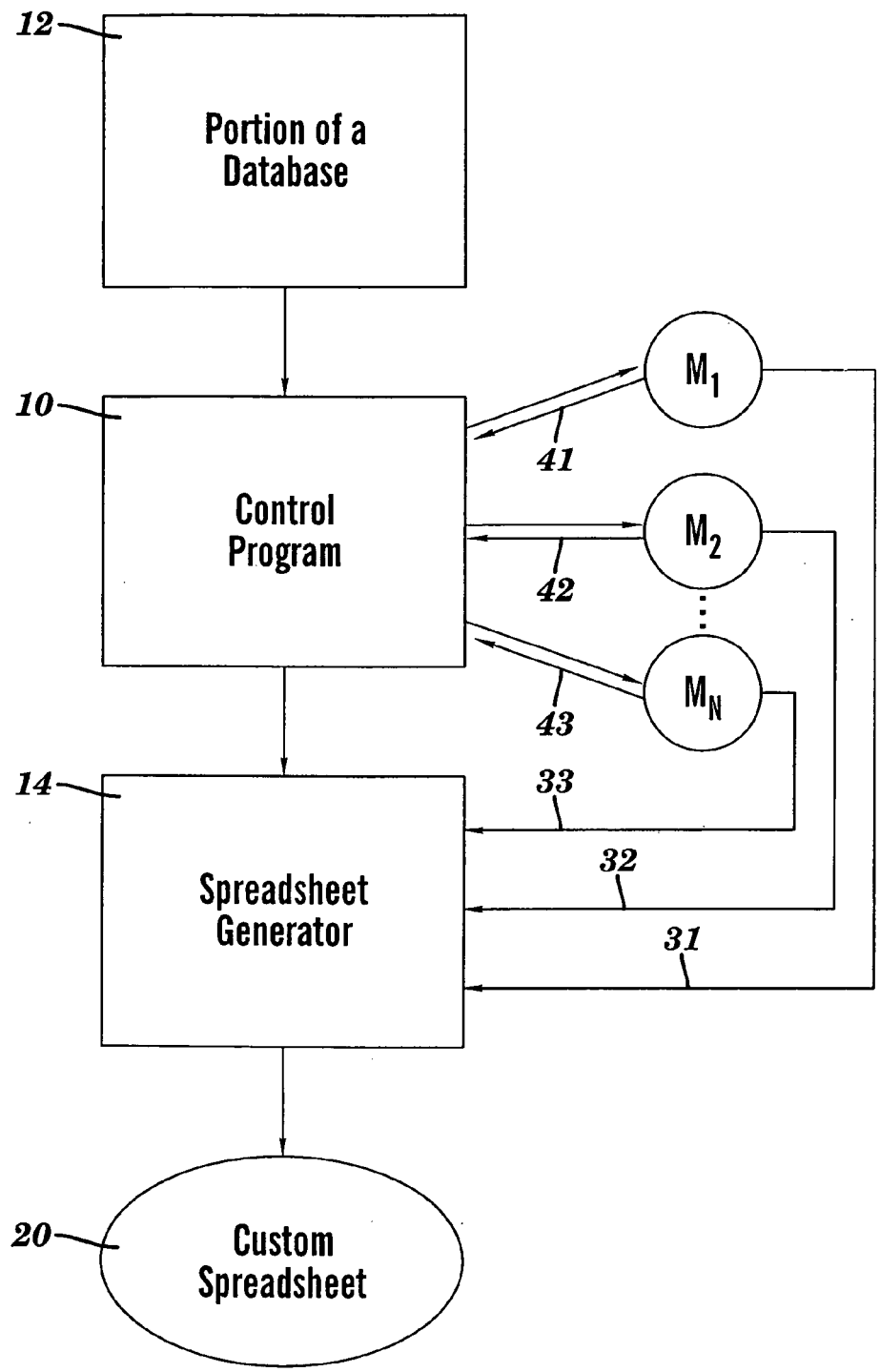
FIG. 5 is a flow chart for software that generates a custom spreadsheet, in accordance with embodiments of the present invention.

FIG. 1 depicts a view into a database structure, said view disclosing a list of documents, in accordance with embodiments of the present invention. A "database structure" is defined herein as an organized group of databases, spreadsheets, tables, files, etc. capable of storing data in tabular form. As an example, the database structure may comprise, inter alia, LOTUS NOTES® databases. The database structure exists with an operating system environment such as, inter alia, a LOTUS DOMINO® software environment. A "view into a database structure" is known in the art as a "virtual table" in which data of the database structure is represented in the form of a table, but does not actually exist as a table of the database structure. The documents listed in the view of FIG. 1 are of a type known as "Account Group" documents, and each row in the view of FIG. 1 that has a value in the "Account Group ID" column denotes a distinct document. Thus each document in the view of Table 1 is characterized by a unique combination of values of the first four columns: "Year", "Month", "Service Description", and Account Group ID". The remaining columns ("Plan", "Actual", "Delta", "%Delta", "YTD Plan", "YTD Actual", and "YTD Delta", . . . ) for each row include data that is in the document associated with the row. A "document" is a file, table, etc. that includes some or all of the data in said row in the view of FIG. 1, as well as other data associated with the document. As an example, the document defined by "Year"=2001, "Month"=April, "Service Description"=LB LONG, and "Account Group ID"=34AE2 includes the following document data: "Plan"=1,005; "Actual"=1,452; "Delta"=447; "%Delta"=44.48; "YTD Plan"=2,548; "YTD Actual"=3,129; "YTD Delta"=581, . . . . The actual spreadsheet portion of the view of FIG. 1 is the columns of "Plan", "Actual", "%Delta", "YTD Plan", "YTD Actual", "YTD Delta", . . . , in all rows that correspond to a document. Definitionally, "Plan" denotes an amount of dollars planned to be spent during the "Month", "Actual" denotes the number of dollars actually spent during the "Month", "Delta"="Actual"−"Plan", "%Delta"=100×("Delta"/"Plan") where division by zero results in 0.00, "YTD Plan" denotes an amount of dollars planned to be spent during the "Year" (from the beginning of the "Year" through the "Month"), "YTD Actual" denotes the number of dollars actually spent during the "Year" (from the beginning of the "Year" through the "Month"), and "YTD Delta"="YTD Actual"−"YTD Plan". The symbol ∇ next to a value in a given column signifies that the value in the given column pertains to all subsequent rows until another value in the given column appears. The symbol ▷ next to a value in a given column signifies that the value in the given column pertains to only the row that actually includes the value in the given column.

FIG. 2 depicts the document listed in the view of FIG. 1 characterized by "Year"=2001, "Month"=April, "Service Description"=LB LONG, and "Account Group ID"=34AE2, in accordance with embodiments of the present invention. The document of FIG. 2 lists some or all of the data in the view of FIG. 1 for the document as well as other data associated with the document (e.g., "Account Group Description"=Logistics, "Percent of Plan ($)"=144.5, etc.).

FIG. 3 depicts a custom spreadsheet (also called herein a "report") generated from the view of FIG. 1, in accordance with embodiments of the present invention. The custom spreadsheet of FIG. 3 may include some or all of the spreadsheet columns of the view of FIG. 1, and may also include one or more columns which are not spreadsheet columns of the view of FIG. 1. For example, the custom spreadsheet of FIG. 3 does not include the "%Delta" column of the view of FIG. 1. As another example, the custom spreadsheet of FIG. 3 includes a "Pct of Plan %" column which does not exist as a spreadsheet column of the view of FIG. 1. The custom spreadsheet of FIG. 3 may also include calculated information, such as a calculated function of one or more columns that is in the view or in the customer spreadsheet. For example, the "Pct of Plan %" in FIG. 3 is calculated as 100*("Curr Month Actual"/"Curr Month Plan"), which shows a value of "100+" if "Curr Month Plan" is zero. The custom spreadsheet of FIG. 3 has special underlining of column names and of totals and subtotals.

The custom spreadsheet of FIG. 3 may be configured in various ways, in accordance with rule sets. A "rule set" is defined as a set of one of more rules. In light of the numerous possible types of spreadsheets in many different applications, the rule sets are generally depend on a "report identifier" that denotes a spreadsheet type. The spreadsheet type of FIG. 3 is an "Account Group" spreadsheet type.

FIG. 6 shows rule set types that may be applicable to the custom spreadsheet of FIG. 3. Column Selection Rules control which columns not in the view of FIG. 1 are added to the custom spreadsheet, and also which columns in the view of FIG. 1 are omitted in the custom spreadsheet. Such Column Selection Rules are highly dependent on the report identifier and may also vary in a case-dependent manner for different custom spreadsheets having the same report identifier. Range Formatting Rules control the appearance of text in the custom spreadsheet cells that do not have column titles, and include such items as font, color, data type (e.g., text, integer, floating point, justification (e.g., left, right, center). Column Title Rules control column title labeling and column title formatting (e.g., font, color, justification). Report Header Rules control report header content and report header formatting (e.g., font, color, justification). Examples of header content in the custom spreadsheet of FIG. 3 include: "DCS North Solution Team", "IBM Global Services", "BLM Server", etc. Report Footer Rules control report footer content and report footer formatting (e.g., font, color, justification). FIG. 3 does not show report footer content, because the bottom portion of FIG. 3 is truncated, so that footers are not visible in FIG. 3. Totaling Rules control totaling and subtotaling content, as well as totaling and subtotaling formatting. Translation Rules control translating or converting data from one format to another such as, inter alia, converting decimal values to percentages, rounding values, converting text (e.g. "January" becomes "Jan." or "1"), converting time values to include AM or PM, etc. Calculation Rules control data calculations such as, inter alia, the calculation of the added "Pct of Plan %" column added to the custom spreadsheet, described supra. Report Naming And Placement Rules control report naming and report location (e.g., server, web, directory path, etc.). For example, the report in FIG. 3 is named "Report of Account Group 34AE2 For April 2001." Document Collection rules control a method of obtaining, and a criteria for selecting, a subset of database documents to export.

Noting that the custom spreadsheet may comprise one or more "sheets" (also called "pages"), the Sheet Rules in FIG. 6 control naming of sheets and formatting of sheets. For example, FIGS. 3 and 4 are each sheets of a single custom spreadsheet, with the sheets of FIGS. 3 and 4 being respectively named as "($ Sheet)" and "(H Sheet)". FIG. 4 depicts a second custom spreadsheet that differs from the first custom spreadsheet of FIG. 3 in that the first custom spreadsheet expresses amounts in units of dollars ($) whereas the second custom spreadsheet expresses amounts in units of hours (H) of work. Aside from the distinction between dollars ($) and hours (H), the rule sets that pertain to the sheets of the custom spreadsheet of FIGS. 3 and 4 comprise one or more rule sets that are common to the sheets of FIGS. 3 and 4. Such common rule sets are designated as "integrative sets" that cut across the sheets of FIGS. 3 and 4. Generally, a multi-sheet spreadsheet comprises a plurality of sheets, and the multi-sheet spreadsheet may have at least one integrative rule set that cuts across at least two sheets of the plurality of sheets.

The document of FIG. 2 was used, in combination with the view of FIG. 1, to generate the custom spreadsheets of FIGS. 3 and 4. Nonetheless, a document may be used to generate the custom spreadsheet but is not required to be so used, since the information required to be in the custom spreadsheet is typically available from other sources such as a view of the database, the database directly, and/or user input. Similarly, a view may be used to generate the custom spreadsheet but is not required to be so used, since the information required to be in the custom spreadsheet is typically available from other sources such as a document, the database directly, and/or user input. Regardless of whether views and/or documents are used to generate the custom spreadsheet, all of the prior discussion of rule sets, rules, software modules, etc, apply to the generation of the custom spreadsheet in accordance with the present invention.

Generally, the present invention transforms a portion of a database into a custom spreadsheet. Said portion may alternatively be any portion of the database. For example, said portion may be a view such as has been described herein in FIGS. 1-4. As another example, said portion may be a table, a portion of a table, a collection of tables, etc. of the database.

The particular column variables and associated names, their arrangement, data values, text, etc., appearing in FIGS. 1-4 are merely illustrative. The custom spreadsheets (and associated views, documents, tables, etc.) of the present invention include any number and arrangement of columns and rows, column names, data vales, text, etc.

FIG. 5 is a flow chart for software that transforms a custom spreadsheet 20 from a portion (e.g., a view) 12 of a database (e.g., a LOTUS DOMINO® database), in accordance with embodiments of the present invention. The software includes a control program (also called a "main report processor") 10 that manages the process of generating the custom spreadsheet 20. The control program 10 may execute normally in the foreground, or may execute in the background as an "agent." An "agent" is a computer executable program or software that functions as a background process within the operating system environment. The agent can function concurrent with, and independent of, other software execution that is occurring within the operating system environment.

The control program 10 determines: whether to omit in the custom spreadsheet 20 a column that is in the portion 12, whether to add to the custom spreadsheet 20 a column that is not in the portion 12, or combinations thereof, such as by, inter alia, using the Column Selection Rules described supra in conjunction with FIG. 6. The control program 10 invokes N software modules (N≧1), identified as $M_1, M_2, \ldots M_N$, to "retrieve" N corresponding rule sets, denoted as $R_1, R_2, \ldots R_N$, needed for performing N corresponding functions $F_1, F_2, \ldots F_N$. A "software module" is any distinct software code that has some level of separation from the control program 10. The module may be in the form of object code or in source form such that the module must be interpreted in order to be executed. Examples of a software modules includes a script (e.g., a LOTUS® script), a stand-alone program, a subroutine (or subprogram or function) of the control program 10, etc. The N modules may be stored or distributed anywhere within the computer system in which the generation of the custom spreadsheet 20 occurs, such as in a module library stored on a magnetic disk. To illustrate the preceding notation for with reference to FIG. 6, $R_1$ may represent Range Formatting Rules retrieved by module $M_1$ that is named RangeFormat, wherein $R_1$ is needed for performing the function $F_1$ of formatting for font, color, data type justification, etc. Similarly with reference to FIG. 6, $R_2$ may represent Report Header Rules, $R_3$ may represent Calculation rules, etc.

To "retrieve" a rule set means to obtain the rule set in any manner, such as by extracting the rule set from a file or table, generating the rule set from an algorithm, etc. The functions $F_1, F_2, \ldots F_N$ may be performed by a spreadsheet generator 14, which directly implements the rules of the rule sets $R_1, R_2, \ldots R_N$, respectively. The spreadsheet generator 14 may include, inter alia, commercial software such as LOTUS® software that supports generation of LOTUS 1-2-3® spreadsheets, wherein the custom spreadsheet 20 is a LOTUS 1-2-3® spreadsheet. Although not shown in FIG. 5, the spreadsheet generator 14 may alternatively exist as code within the control program 10. The modules $M_1, M_2, \ldots M_N$ may communicate the retrieved N rule sets $R_1, R_2, \ldots R_N$ directly to the spreadsheet generator 14 via data paths 31, 32, ..., 33, or indirectly to the spreadsheet generator 14 via data paths 41, 42, ..., 43 to the control program 10 followed by communication of the N rule sets from the control program 10 to the spreadsheet generator 14 via the data path 22. Alternatively, the functions $F_1, F_2, \ldots F_N$ based on the rules $R_1, R_2, \ldots R_N$ could be performed by the modules $M_1, M_2, \ldots M_N$, or by the control program 10, instead of by the spreadsheet generator 14.

The preceding discussion of the flow chart of FIG. 5 disclosed various logical schemes for transforming the custom spreadsheet 20 from the portion 12. The scope of the present invention includes any variation of the aforementioned logical schemes that would be known or obvious to one of ordinary skill in the art.

Figure 7:
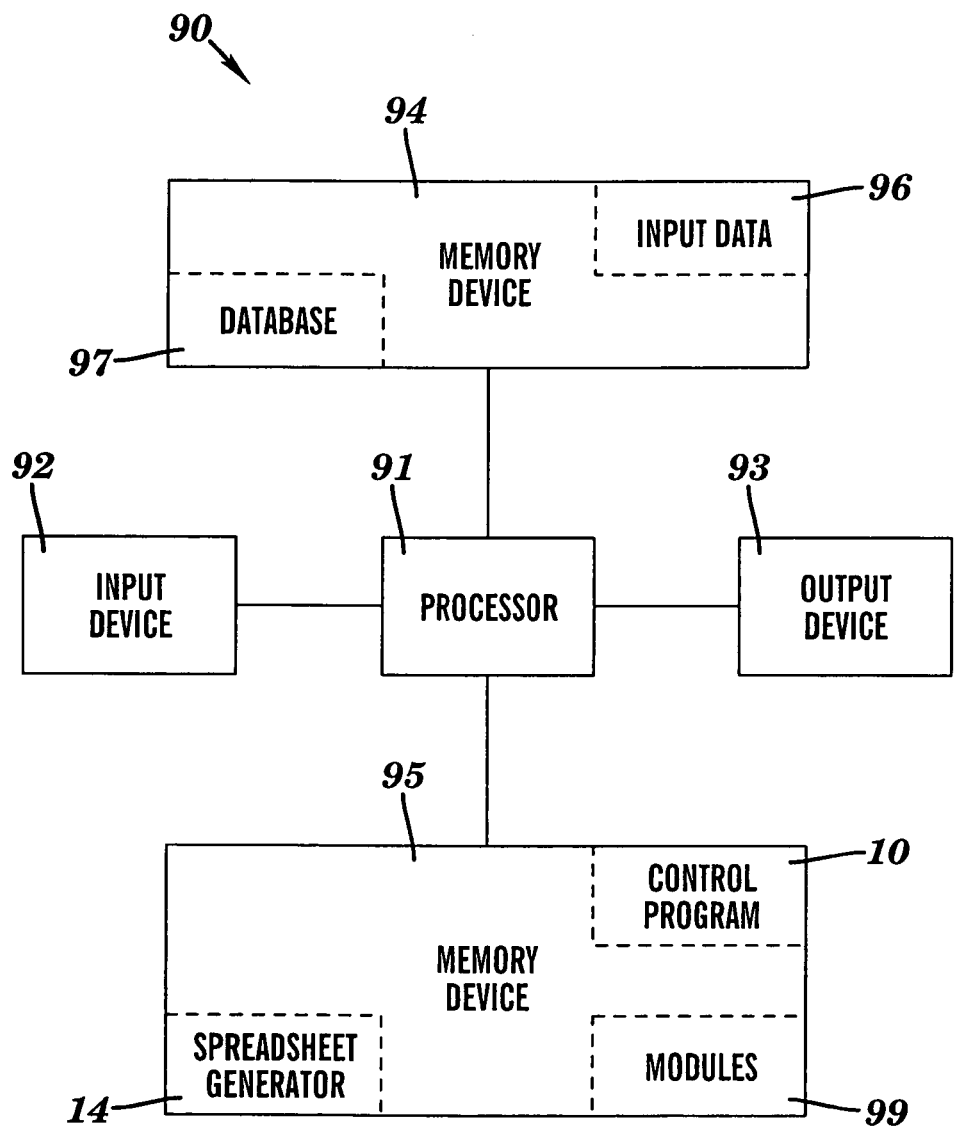
FIG. 7 depicts a computer system for generating a custom spreadsheet, in accordance with embodiments of the present invention.

FIG. 7 depicts a computer system 90 for generating the custom spreadsheet 20 (see FIG. 5), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95, which is a computer usable medium, stores the control program 10, the spreadsheet generator 14, and the N modules 99. The memory device 94, which is a computer usable medium, stores the database 97 from which the portion 12 (see FIG. 5) is derived. The processor 91 executes the control program 10, the modules 99, and the spreadsheet generator 14. The memory device 94 includes input data 96. The input data 96 includes input required by the control program 10, the modules 99, and the spreadsheet generator 14. The output device 93 displays output, such as the portion 12 (see FIG. 5), the custom spreadsheet 20 (see FIG. 5), etc.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices. As another example, the control program 10, the modules 99, the spreadsheet generator 14, and the database 97 may be distributed in the memory devices 94 and 95 in a different manner than is shown in FIG. 7.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for generating a custom spreadsheet, said method implemented by execution of a control program on a processor of a computer system, said method comprising:

said processor generating a view of a database, wherein the view of the database includes data of the database and is represented in the form of a table but does not actually exist as a table of the database; and said processor transforming the view of the database into the custom spreadsheet;

wherein the transforming includes performing N functions $F_1, F_2, \ldots, F_N$ based on N rule sets $R_1, R_2, \ldots, R_N$, respectively, wherein N is at least 1;

wherein the transforming includes executing said control program, wherein executing the control program includes invoking N software modules $M_1, M_2, \ldots, M_N$ which respectively retrieve the rule sets $R_1, R_2, \ldots, R_N$; and wherein invoking the modules $M_1, M_2, \ldots, M_N$ includes performing by the modules $M_1, M_2, \ldots M_N$ the functions $F_1, F_2, \ldots, F_N$ based on rule sets $R_1, R_2, \ldots, R_N$, respectively;

wherein the N rule sets include:

range formatting rules for controlling the appearance of text in the custom spreadsheet cells that do not have column titles, column title rules for controlling column title labeling and column title formatting, report header rules for controlling report header content and report header formatting, report footer rules for controlling report footer content and report footer formatting, totaling rules for controlling totaling and subtotaling content, translation rules for controlling translating data or converting data from one format to another, calculation rules for controlling data calculations, sheet rules for controlling naming of sheets and formatting of sheets, report naming rules for controlling data report naming, and report placement rules for controlling data report location.

2. The method of claim 1, wherein the N modules retrieve the N rule sets based on a report identifier that denotes a spreadsheet type.

3. The method of claim 1, wherein the control program is a computer executable program that functions as a background process within an operating system environment of the computer system and is executed concurrent with, and independent of, other software execution that is occurring within the operating system environment.

4. The method of claim 1, wherein N is at least 2.

5. The method of claim 1, wherein said transforming further includes:
- omitting in the custom spreadsheet a column that is in the view, which results in the custom spreadsheet not including data that is in the omitted column;
- adding to the custom spreadsheet a column that is not in the view, which results in the custom spreadsheet including data that is in the added column; or
- said omitting and said adding.

6. The method of claim 1,
- wherein the custom spreadsheet comprises columns and rows,
- wherein the view of the database comprises columns and rows,
- wherein the columns of the view consist of document columns and remaining columns,
- wherein each row of the view has values in the document columns that make each row unique, and
- wherein a column of the custom spreadsheet consists of a corresponding remaining column of the view.

7. The method of claim 6, wherein the method further comprises generating a document having data therein, wherein the data in the document consists of data that is specific to a row of the view.

8. A computer system comprising a processor and a computer readable storage medium storing a control program adapted to be executed on the processor to implement a method for generating a custom spreadsheet, said method comprising:
- generating a view of a database, wherein the view of the database includes data of the database and is represented in the form of a table but does not actually exist as a table of the database; and
- transforming the view of the database into the custom spreadsheet;
- wherein the transforming includes performing N functions $F_1, F_2, \ldots, F_N$ based on N rule sets $R_1, R_2, \ldots, R_N$, respectively,
- wherein N is at least 1;
- wherein the transforming includes executing said control program, wherein executing the control program includes invoking N software modules $M_1, M_2, \ldots, M_N$ which respectively retrieve the rule sets $R_1, R_2, \ldots, R_N$; and
- wherein invoking the modules $M_1, M_2, \ldots, M_N$ includes performing by the modules $M_1, M_2, \ldots, M_N$ the functions $F_1, F_2, \ldots, F_N$ based on rule sets $R_1, R_2, \ldots, R_N$, respectively;
- wherein the N rule sets include:
  - range formatting rules for controlling the appearance of text in the custom spreadsheet cells that do not have column titles,
  - column title rules for controlling column title labeling and column title formatting,
  - report header rules for controlling report header content and report header formatting,
  - report footer rules for controlling report footer content and report footer formatting,
  - totaling rules for controlling totaling and subtotaling content,
  - translation rules for controlling translating data or converting data from one format to another,
  - calculation rules for controlling data calculations,
  - sheet rules for controlling naming of sheets and formatting of sheets,
  - report naming rules for controlling data report naming, and
  - report placement rules for controlling data report location.

9. The computer system of claim 8, wherein the N modules retrieve the N rule sets based on a report identifier that denotes a spreadsheet type.

10. The computer system of claim 8, wherein N is at least 2.

11. The computer system of claim 8, wherein said transforming further includes:
- omitting in the custom spreadsheet a column that is in the view, which results in the custom spreadsheet not including data that is in the omitted column;
- adding to the custom spreadsheet a column that is not in the view, which results in the custom spreadsheet including data that is in the added column; or
- said omitting and said adding.

12. The computer system of claim 8,
- wherein the custom spreadsheet comprises columns and rows,
- wherein the view of the database comprises columns and rows,
- wherein the columns of the view consist of document columns and remaining columns,
- wherein each row of the view has values in the document columns that make each row unique, and
- wherein a column of the custom spreadsheet consists of a corresponding remaining column of the view.

13. The computer system of claim 12, wherein the method further comprises generating a document having data therein, wherein the data in the document consists of data that is specific to a row of the view.

14. A computer program product, comprising a computer readable storage medium having a computer readable code embodied therein, said computer readable code including a control program adapted to be executed by a processor of a computer system to implement a method for generating a custom spreadsheet, said method comprising:
- generating a view of a database, wherein the view of the database includes data of the database and is represented in the form of a table but does not actually exist as a table of the database; and
- transforming the view of the database into the custom spreadsheet
- wherein the transforming includes performing N functions $F_1, F_2, \ldots, F_N$ based on N rule sets $R_1, R_2, \ldots, R_N$, respectively,
- wherein N is at least 1;
- wherein the transforming includes executing said control program, wherein executing the control program includes invoking N software modules $M_1, M_2, \ldots, M_N$ which respectively retrieve the rule sets $R_1, R_2, \ldots, R_N$; and
- wherein invoking the modules $M_1, M_2, \ldots, M_N$ includes performing by the modules $M_1, M_2, \ldots, M_N$ the functions $F_1, F_2, \ldots, F_N$ based on rule sets $R_1, R_7, \ldots, R_N$, respectively;
- wherein the N rule sets include:
  - range formatting rules for controlling the appearance of text in the custom spreadsheet cells that do not have column titles,
  - column title rules for controlling column title labeling and column title formatting,
  - report header rules for controlling report header content and report header formatting, report footer rules for controlling report footer content and report footer formatting, totaling rules for controlling totaling and subtotaling content, translation rules for controlling translating data or converting data from one format to another, calculation rules for controlling data calculations, sheet rules for controlling naming of sheets and formatting of sheets, report naming rules for controlling data report naming, and report placement rules for controlling data report location.

15. The computer program product of claim 14, wherein the N modules retrieve the N rule sets based on a report identifier that denotes a spreadsheet type.

16. The computer program product of claim 14, wherein N is at least 2.

17. The computer program product of claim 14, wherein said transforming further includes:

omitting in the custom spreadsheet a column that is in the view, which results in the custom spreadsheet not including data that is in the omitted column;

adding to the custom spreadsheet a column that is not in the view, which results in the custom spreadsheet including data that is in the added column; or said omitting and said adding.

18. The computer program product of claim 14, wherein the custom spreadsheet comprises columns and rows, wherein the view of the database comprises columns and rows, wherein the columns of the view consist of document columns and remaining columns, wherein each row of the view has values in the document columns that make each row unique, and wherein a column of the custom spreadsheet consists of a corresponding remaining column of the view.

19. The computer program product of claim 18, wherein the method further comprises generating a document having data therein, wherein the data in the document consists of data that is specific to a row of the view.

* * * * *